(12) United States Patent
Rangan

(10) Patent No.: US 6,711,654 B2
(45) Date of Patent: Mar. 23, 2004

(54) MECHANISM FOR BANK CONFLICT RESOLUTION FOR AN OUT-OF-ORDER CACHE

(75) Inventor: Srinivasa Rangan, Austin, TX (US)

(73) Assignee: Intel Corporation, Santa Clara, CA (US)

(*) Notice: Subject to any disclaimer, the term of this patent is extended or adjusted under 35 U.S.C. 154(b) by 285 days.

(21) Appl. No.: 09/894,469

(22) Filed: Jun. 28, 2001

(65) Prior Publication Data
US 2003/0005229 A1 Jan. 2, 2003

(51) Int. Cl.$^7$ ............................................. G06F 12/06
(52) U.S. Cl. ........................ 711/150; 711/5; 711/131; 711/140
(58) Field of Search ............................ 711/3, 5, 118, 711/129, 130, 131, 140, 150, 151

(56) References Cited

U.S. PATENT DOCUMENTS

| 5,740,402 | A | * | 4/1998 | Bratt et al. | 711/157 |
| 6,081,873 | A | * | 6/2000 | Hetherington et al. | 711/131 |
| 6,425,044 | B1 | * | 7/2002 | Jeddeloh | 711/5 |
| 6,539,457 | B1 | * | 3/2003 | Mulla et al. | 711/131 |

* cited by examiner

Primary Examiner—Gary Portka
(74) Attorney, Agent, or Firm—Blakely, Sokoloff, Taylor & Zafman LLP

(57) ABSTRACT

According to one embodiment, a computer system is disclosed. The computer system includes a microprocessor and a first cache coupled to the microprocessor. The first cache detects conflicts between multiple requests to access a bank within the first cache.

12 Claims, 5 Drawing Sheets

|        | Entry 0 | Entry 1 | Entry 2 | Entry 3 |
|--------|---------|---------|---------|---------|
| Entry 0 | 0 | 1 | 0 | 0 |
| Entry 1 | 1 | 0 | 0 | 0 |
| Entry 2 | 0 | 0 | 0 | 1 |
| Entry 3 | 0 | 0 | 1 | 0 |

|        | Entry 29 | Entry 30 | Entry 31 |
|--------|----------|----------|----------|
| Entry 29 | 0 | 0 | 0 |
| Entry 30 | 0 | 0 | 0 |
| Entry 31 | 0 | 0 | 0 |

|        | Entry 29 | Entry 30 | Entry 31 |
|--------|----------|----------|----------|
| Entry 0 | 0 | 0 | 0 |
| Entry 1 | 0 | 0 | 1 |
| Entry 2 | 0 | 0 | 0 |
| Entry 3 | 0 | 0 | 0 |

|        | Entry 0 | Entry 1 | Entry 2 | Entry 3 |
|--------|---------|---------|---------|---------|
| Entry 29 | 0 | 0 | 0 | 0 |
| Entry 30 | 0 | 0 | 0 | 0 |
| Entry 31 | 0 | 1 | 0 | 0 |

FIG. 5

MECHANISM FOR BANK CONFLICT RESOLUTION FOR AN OUT-OF-ORDER CACHE

FIELD OF THE INVENTION

The present invention relates to computer systems; more particularly, the present invention relates to the resolution of bank conflicts between memory accesses in high performance microprocessors.

BACKGROUND

Due to the difference in cycle time between microprocessors and main memory in a computer system, microprocessors typically implement one or more cache memories (cache). A cache is a small, fast intermediary memory device that typically only includes data and instructions most recently used. In some designs caches include multiple banks in order to enable multiple accesses to be performed during each clock cycle. A multiple bank cache is divided such that datum can be stored in one bank. Each bank allows for one access each clock cycle. An interconnection network is implemented to route each instruction/datum to the correct bank.

Moreover, a cache may employ non-blocking behavior that allows multiple misses from higher-level caches to be pending. Non-blocking behavior also enables a microprocessor core to continue execution until requested data can be retrieved and used. The multiple miss requests are usually stored in a queue structure. For example, if there are multiple misses in a first level (e.g., L1) cache, the misses are stored in a queue that needs access to a second level (e.g., L2) cache. Entries from the queue can be used to access the L2 cache in a first in first out (FIFO) scheme or an out-of-order scheme.

However, in order to increase queue bandwidth, multiple ports from the queue may access the bank array. The multiple ports may have miss requests that attempt to simultaneously access the same banks in the cache, thus, leading to conflicts.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 5 illustrates one embodiment of a bank conflict array.

DETAILED DESCRIPTION

A mechanism for resolving bank conflicts in an out-of-order cache is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
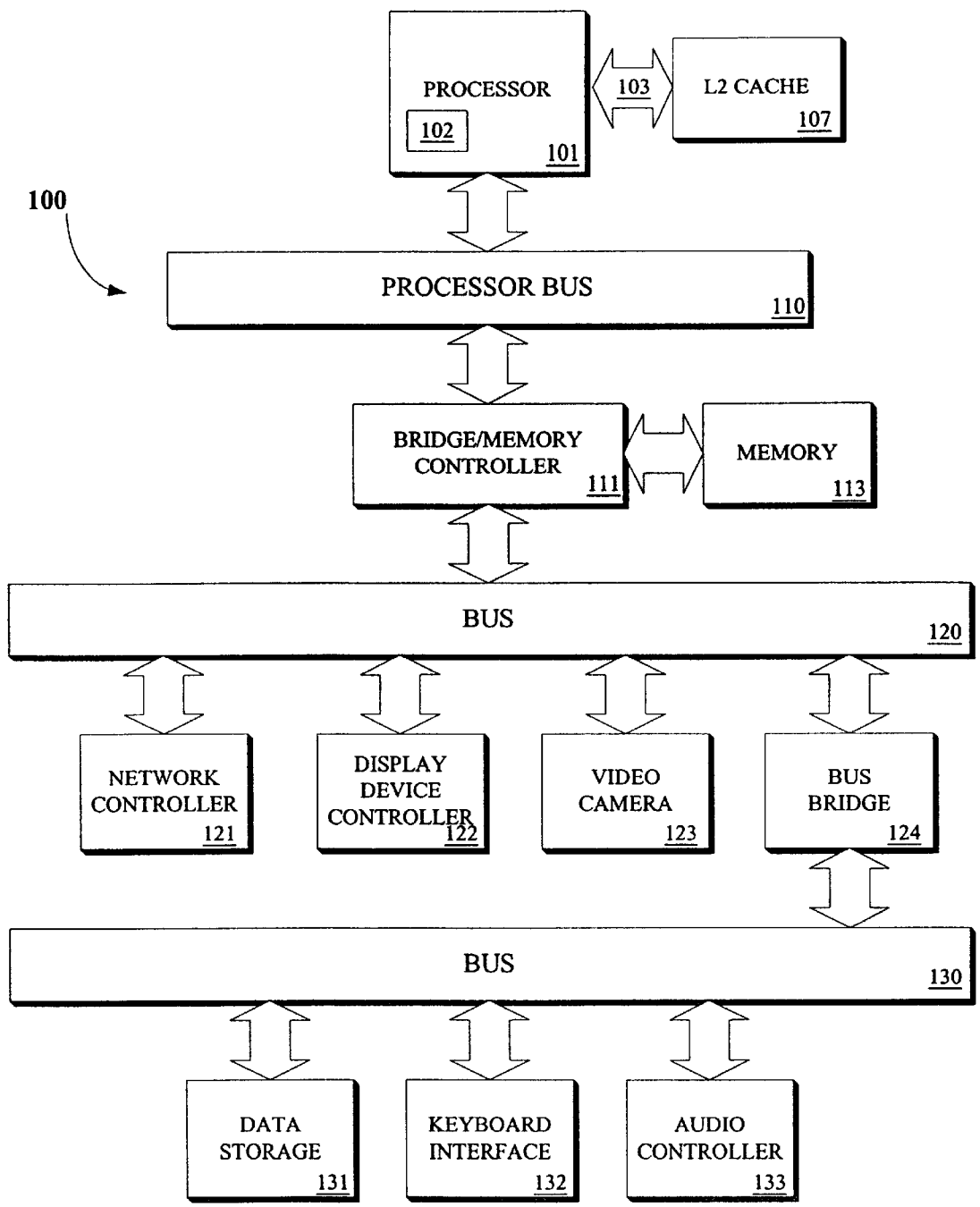
FIG. 1 is a block diagram of one embodiment of a computer system.

FIG. 1 is a block diagram of one embodiment of a computer system 100. The computer system 100 includes a processor 101 that processes data signals. Processor 101 may be a complex instruction set computer (CISC) microprocessor, a reduced instruction set computing (RISC) microprocessor, a very long instruction word (VISW) microprocessor, a processor implementing a combination of instruction sets, or other processor device.

In one embodiment, processor 101 is a processor in the Pentium® family of processors including the Pentium® II family and mobile Pentium® and Pentium® II processors available from Intel Corporation of Santa Clara, Calif. Alternatively, other processors may be used. FIG. 1 shows an example of a computer system 200 employing a single processor computer. However, one of ordinary skill in the art will appreciate that computer system 100 may be implemented using having multiple processors.

Processor 101 is coupled to a processor bus 110. Processor bus 110 transmits data signals between processor 101 and other components in computer system 200. In one embodiment, processor 101 is also coupled to cache memory 107, which is a second level (L2) cache memory, via dedicated cache bus 103. Alternatively, cache memory 107 may be coupled to processor 110 by a shared bus. According to one embodiment, a cache memory 102 resides within processor 101 which is a first level (L1) cache that stores data signals that are also stored in an external memory 113. Cache memories 102 and 107 speed up memory accesses by processor 101 by taking advantage of their locality of access. In another embodiment, cache 102 resides external to processor 101 and is a non-blocking cache. The L1 and L2 cache memories can also be integrated into a single device.

Computer system 100 also includes a memory 113. In one embodiment, memory 113 is a dynamic random access memory (DRAM) device. However, in other embodiments, memory 113 may be a static random access memory (SRAM) device, or other memory device. Memory 113 may store instructions and code represented by data signals that may be executed by processor 101. Computer system 100 further comprises a bridge memory controller 111 coupled to processor bus 110 and memory 113.

Bridge/memory controller 111 directs data signals between processor 101, memory 113, and other components in computer system 100 and bridges the data signals between processor bus 110, memory 113, and a first input/output (I/O) bus 120. In one embodiment, I/O bus 220 may be a single bus or a combination of multiple buses. In a further embodiment, I/O bus 120 may be a Peripheral Component Interconnect adhering to a Specification Revision 2.1 bus developed by the PCI Special Interest Group of Portland, Oreg. In another embodiment, I/O bus 120 may be a Personal Computer Memory Card International Association (PCMCIA) bus developed by the PCMCIA of San Jose, Calif. Alternatively, other busses may be used to implement I/O bus. I/O bus 120 provides communication links between components in computer system 100.

A network controller 121 is coupled I/O bus 120. Network controller 121 links computer system 100 to a network of computers (not shown in FIG. 1) and supports communication among the machines. A display device controller 122 is also coupled to I/O bus 120. Display device controller 122 allows coupling of a display device to computer system 100, and acts as an interface between the display device and computer system 100. In one embodiment, display device controller 122 is a monochrome display adapter (MDA) card. In other embodiments, display device controller 122 may be a color graphics adapter (CGA) card, an enhanced graphics adapter (EGA) card, an extended graphics array (XGA) card or other display device controller.

The display device may be a television set, a computer monitor, a flat panel display or other display device. The display device receives data signals from processor 201 through display device controller 122 and displays the information and data signals to the user of computer system 100. A video camera 123 is also coupled to I/O bus 120.

Computer system 100 includes a second I/O bus 130 coupled to I/O bus 120 via a bus bridge 124. Bus bridge 124 operates to buffer and bridge data signals between I/O bus 120 and I/O bus 130. I/O bus 130 may be a single bus or a combination of multiple buses. In one embodiment, I/O bus 130 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al.

I/O bus 130 provides communication links between components in computer system 100. A data storage device 131 is coupled to I/O bus 130. I/O device 131 may be a hard disk drive, a floppy disk drive, a CD-ROM device, a flash memory device or other mass storage device. A keyboard interface 132 is also coupled to I/O bus 130. Keyboard interface 132 may be a keyboard controller or other keyboard interface. In addition, keyboard interface 132 may be a dedicated device or can reside in another device such as a bus controller or other controller. Keyboard interface 132 allows coupling of a keyboard to computer system 100 and transmits data signals from the keyboard to computer system 100. An audio controller is also coupled to I/O bus 130. Audio controller 133 operates to coordinate the recording and playing of sounds.

Figure 2:
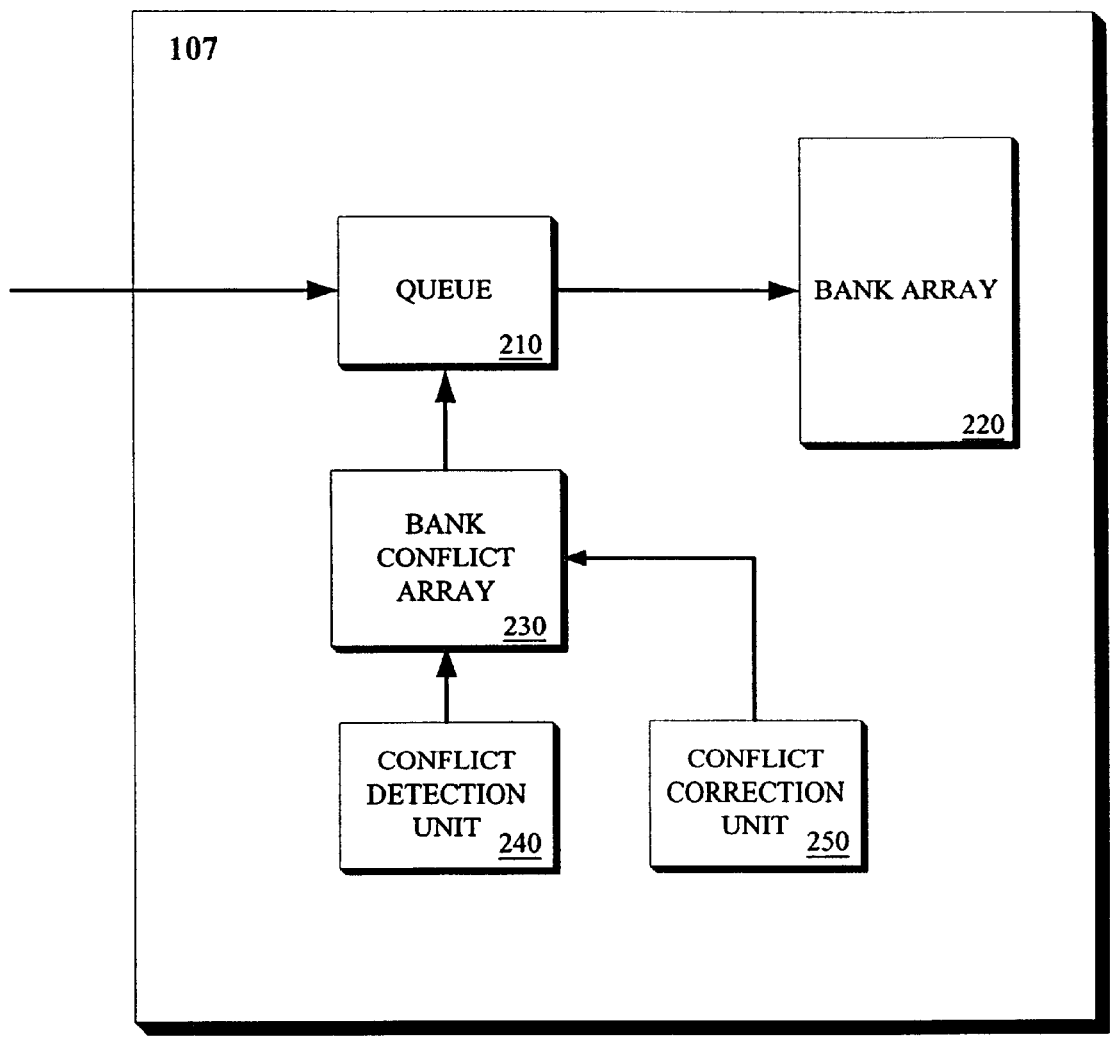
FIG. 2 is a block diagram of one embodiment of a cache.

FIG. 2 is a block diagram of one embodiment of cache 107. Cache 107 includes queue 210, bank array 220, bank conflict array 230, a conflict detection unit 240 and a conflict correction unit 250. Queue 210 temporarily stores requests to access memory banks in bank array 220. According to one embodiment, queue 210 stores thirty-two access requests at any time. However, in other embodiments queue 210 may be implemented with other sizes. In a further embodiment, entries stored in queue 210 may access bank array 220 in an out-of-order mode. As a result, requests may be issued in any order based upon the dependency of the particular requests. In yet another embodiment, queue 210 receives new requests via four connected ports at any one time.

Each request stored in queue 210 includes the physical address bits (bank bits) for the bank in bank array 210 the request is to access. In addition, the request includes the nature of the access. For example, the request may include a load, store, fill, etc. Bank array 220 is an array of memory storage banks. According to one embodiment, bank array includes thirty-two memory banks. However, one of ordinary skill in the art will appreciate that other quantities of banks may be implemented in bank array 220.

According to one embodiment, each queue 210 entry may have a conflict with another entry. However, an entry cannot have a conflict with itself. Bank conflict array 230 is used to track bank conflict within cache 107. In particular, bank conflict array 230 provides a listing for each queue 210 entry of other entries that have a conflict. FIG. 5 illustrates one embodiment of information stored by bank conflict array 230. Array 230 includes a n×n matrix wherein n corresponds to the depth (e.g., the number of entries) of queue 210. Thus, the embodiment illustrated in FIG. 5 includes a 32×32 matrix since queue 210 has a depth of 32 requests at any given time.

In a further embodiment, each entry listed on the horizontal and vertical axis of the matrix corresponds to a particular queue 210 entry. A "0" in array 230 indicates that a particular entry does not have a conflict with another entry. Conversely, a "1" in array 230 indicates that there is a conflict with two entries. For example, following the horizontal conflict listings for entry 0, the "1" at entry 1 indicates that there is a conflict between entries 0 and 1. According to one embodiment, the value in the matrix corresponds to a bank conflict bit that is set to indicate a conflict/no conflict status.

Figure 3:
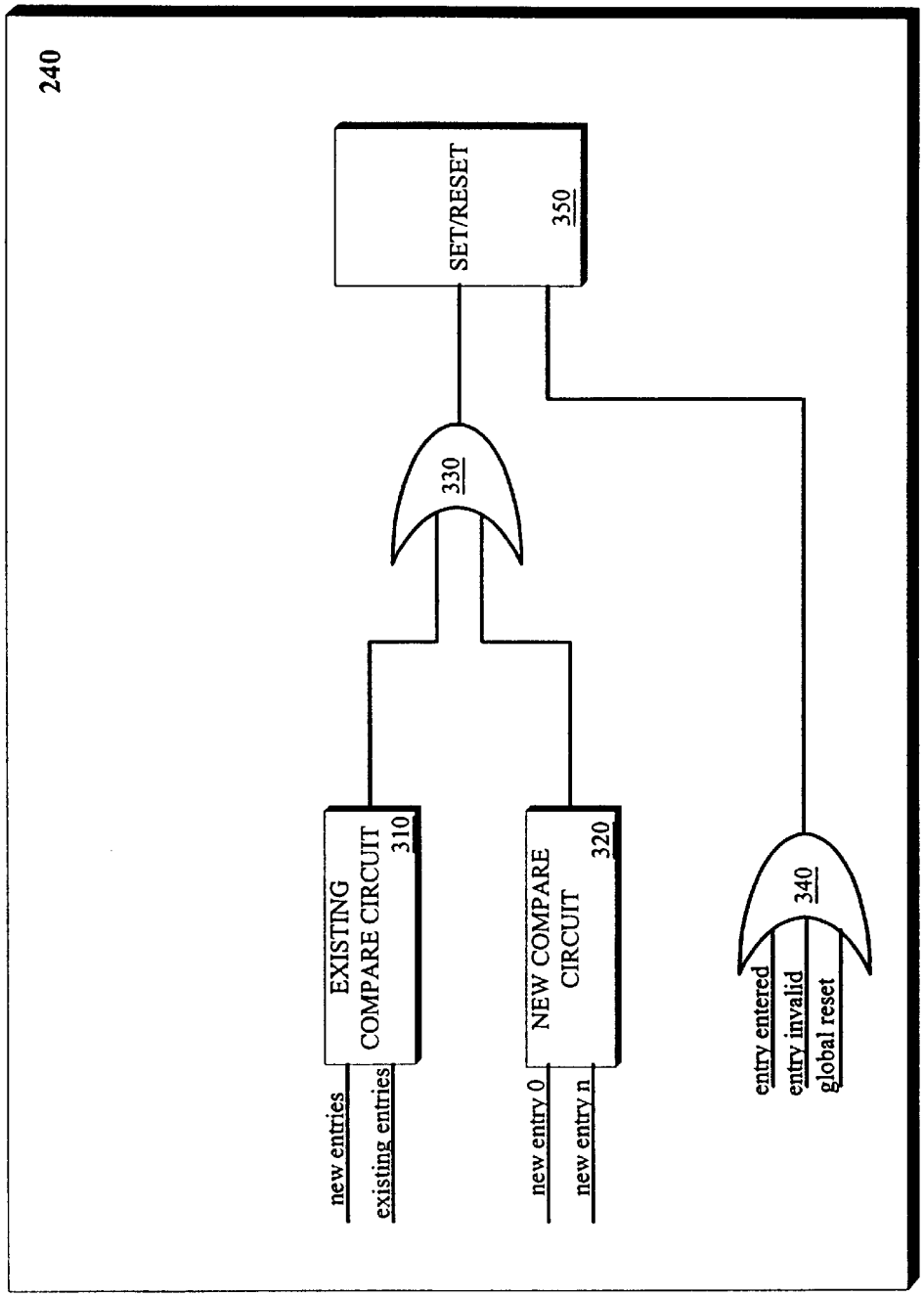
FIG. 3 is a block diagram of one embodiment of a conflict detection unit.

Once a request stored in a particular entry is issued, the conflict is resolved and the value in the matrix is reset. In one embodiment, array 230 is updated each time new entries are received at queue 210. Referring back to FIG. 2, conflict detection unit 240 is used to detect multiple requests in queue 210 to access the same bank in bank array 220. If there is a conflict between two or more requests, the results are reflected in array 230 as described above. FIG. 3 is a block diagram of one embodiment of conflict detection unit 240. Conflict detection unit 240 includes an existing compare circuit 310, a new compare circuit 320, or-gates 330 and 340, and set/reset 350.

Compare circuit 310 compares the physical address bank bits of new request entries received at queue 210 with the physical address bank bits of existing queue 210 entries. According to one embodiment, the comparison between the new and existing entries are implemented using content addressable memory (CAM) structures (not shown). In a further embodiment, compare circuit 310 transmits a high logic value (e.g., logic 1) if bank bits of one or more new entries match the bank bits of one or more existing entries. On the contrary, compare circuit 310 transmits a low logic level (e.g., logic 0) if none of the bank bits of the new entries match bank bits of an existing entry.

New compare circuit 320 compares new entries among themselves inserted into queue 210 based upon physical address bank bits. As described above, the comparison between the new entries are implemented using content addressable memory (CAM) structures. In one embodiment, compare circuit 320 transmits a logic 1 if there is a match between one or more new bank bits, and a logic 0 if there are no matches. The values of compare circuits 310 and 320 are transmitted to or-gate 330. Or-gate 330 transmits a logic 1 if a logic 1 is received from compare circuit 310 or compare circuit 320. Otherwise or-gate 330 transmits a logic 0 to set/reset 350.

Set/reset 350 sets or resets bank conflict bits in bank conflict array 220 (FIG. 2). In one embodiment, set/reset 350 sets a bank conflict bit corresponding to an entry bank conflict array 230 upon a match being detected at compare circuit 310 or compare circuit 320. In one embodiment, set/reset 350 is implemented using a latch. Upon receiving a reset signal, set/reset 350 resets a bank conflict bit corresponding to an entry bank conflict array 230. In one embodiment a pointer is used to indicate which bank conflict bit in array 230 one to be set/reset.

According to one embodiment, or-gate 340 transmits a logic 1 to set/reset 350 based upon one of three reset conditions. One condition may be a global reset (e.g., a pipeline flush in processor 101, wherein the conflict bits for all queue 210 entries are invalidated). A second reset condition may result from an entry becoming invalid prior to issuance. Such a situation may occur upon a speculative fetch request to another cache in computer system 100. Nevertheless, an invalid entry cannot be issued, thus, corresponding bank conflict bits are irrelevant. The third reset condition occurs whenever an entry gets issued. When an older entry is issued from queue 210, the bank conflict bits of dependent younger entries waiting to be issued will be reset, as will be described in further detail below.

Figure 4:
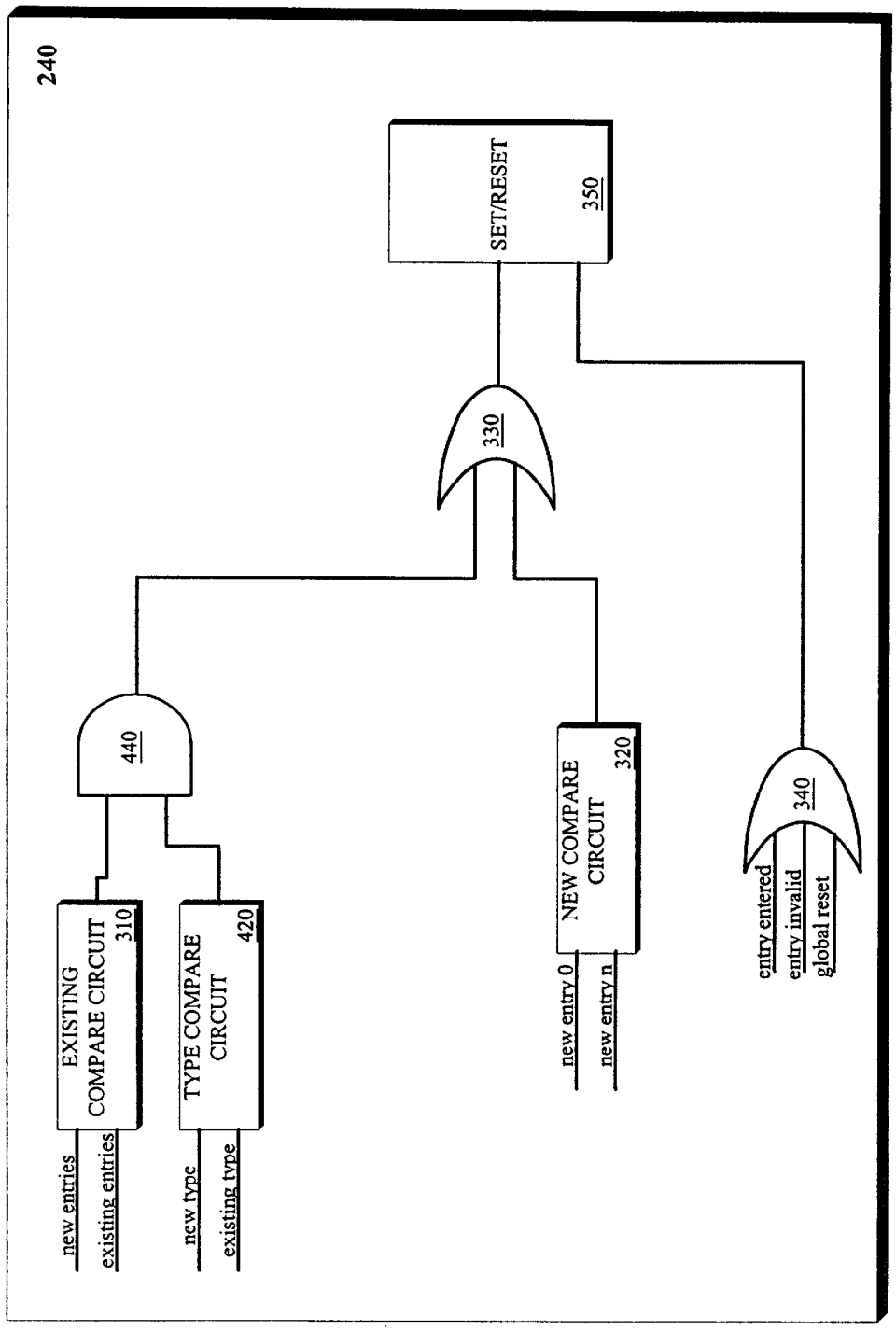
FIG. 4 is a block diagram of another embodiment of a conflict detection unit.

FIG. 4 is a block diagram of another embodiment of conflict detection unit 240. In this embodiment, a type compare circuit 420 is included. Type compare circuit compares the nature of access requests to bank array 220. As described above, the nature of access requests may include loads, stores and fills. If there is a match at compare circuit 310, the results of compare circuit 420 are detected by and-gate 440 to determine whether a match signal is to be transmitted to set/reset 350 via or-gate 330. For instance, a load access for a new load entry being inserted into queue 210 will conflict with an existing entry that also needs a load from the same bank of bank array 230. Thus, in such an embodiment, different types of access to the same bank may not result in a conflict. In one embodiment, load and store conflicts are dependent upon cache 107 pipeline implementation. For example, if loads are completed in a pipeline stage X and stores are completed at pipeline stage X+2, all entries requiring loads in pipeline stage X should be compared to stores in pipeline stage X+2. Referring back to FIG. 2, conflict correction unit 250 corrects conflicts detected at conflict detection unit. According to one embodiment, conflict correction unit 250 implements a priority ordering among entries in queue 210. In such an embodiment, an entry inserted into queue 210 after a previous entry is considered to be dependent upon the previous entry. A dependent entry may be issued only after the previous entry accessing the same bank has been issued. For example, if a new request at entry 1 of array 230 has a bank conflict with older entry 0, entry 1 may not issue until after entry 0 has issued and set/reset 350 has reset the bank conflict bit for entry 1.

The bank conflict resolution mechanism provides a processor such as processor 101 with an efficient method of handling bank conflicts between different cache accesses. In particular, a non-blocking cache supporting the processor may perform more efficiently without experiencing bank conflict penalties, resulting in stalling until the conflict is resolved.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Thus, a mechanism for resolving bank conflicts has been described.

What is claimed is:

1. A computer system comprising:
a microprocessor; and
a first cache, coupled to the microprocessor including:
a bank array;
a queue to store a plurality of request entries to access the bank array: and
a conflict detection unit comprising:
a first compare circuit to compare one or more new queue entries with one or more existing queue entries;
a latch coupled to the first compare circuit to set bank conflict bits upon a match being detected at the first compare circuit;
a second compare circuit to compare two or more new queue entries;
a first or-gate coupled to the first compare circuit, the second compare circuit and the latch; and
second or-gate coupled to the latch, wherein the latch sets bank conflict bits within the bank conflict array upon a match being detected at the second compare circuit and resets bank conflict bits within the bank conflict array upon receiving reset signals from the second or-gate.

2. The computer system of claim 1 wherein the first cache comprises:
a bank conflict array; and
a conflict correction unit.

3. The computer system of claim 2 wherein the bank conflict array tracks conflicts between two or more entries within the queue that are requesting to access the same bank within the bank array.

4. The computer system of claim 3 wherein a bank conflict bit is activated at the bank conflict array to indicate a conflict.

5. The computer system of claim 2 wherein the conflict correction unit corrects bank conflicts based upon priority ordering of entries in the queue.

6. A computer system comprising:
a microprocessor; and
a first cache, coupled to the microprocessor including:
a bank array;
a queue to store a plurality of request entries to access the bank array; and
a conflict detection unit comprising:
a first compare circuit to compare one or more new queue entries with one or more existing queue entries;
a latch coupled to the first compare circuit to set bank conflict bits upon a match being detected at the first compare circuit;
a second compare circuit to compare two or more new queue entries;
a first or-gate coupled to the first compare circuit, the second compare circuit and the latch;
a third compare circuit to compare the access type of one or more new queue entries with one or more existing queue entries; and
an and-gate coupled to the first compare circuit, the third compare circuit and the first or-gate.

7. A cache memory comprising:
a bank array;
a queue to store a plurality of request entries to access the bank array; and
a conflict detection unit comprising:
a first compare circuit to compare one or more new queue entries with one or more existing queue entries;
a latch coupled to the first compare circuit to set bank conflict bits upon a match being detected at the first compare circuit;

a second compare circuit to compare two or more new queue entries;

a first or-gate coupled to the first compare circuit, the second compare circuit and the latch; and second or-gate coupled to the latch, wherein the latch sets bank conflict bits within the bank conflict array upon a match being detected at the second compare circuit and resets bank conflict bits within the bank conflict array upon receiving reset signals from the second or-gate.

8. The cache memory of claim 7 further comprising:

a bank conflict array; and a conflict correction unit.

9. The cache memory of claim 8 wherein the bank conflict array tracks conflicts between two or more entries within the queue that are requesting to access the same bank within the bank array.

10. The cache memory of claim 9 wherein the bank conflict bits are activated at the bank conflict array to indicate conflicts.

11. The cache memory of claim 8 wherein the conflict correction unit corrects bank conflicts based upon priority ordering of entries in the queue.

12. A cache memory comprising:

a bank array;

a queue to store a plurality of request entries to access the bank array; and a conflict detection unit comprising;
- a first compare circuit to compare one or more new queue entries with one or more existing queue entries;
- a latch coupled to the first compare circuit to set bank conflict bits upon a match being detected at the first compare circuit;
- a second compare circuit to compare two or more new queue entries;
- a first or-gate coupled to the first compare circuit, the second compare circuit and the latch;
- a third compare circuit to compare the access type of one or more new queue entries with one or more existing queue entries; and
- an and-gate coupled to the first compare circuit, the third compare circuit and the first or-gate.

* * * * *